United States Patent [19]

Koziol

[11] Patent Number: 4,488,534
[45] Date of Patent: Dec. 18, 1984

[54] DUAL ADJUSTABLE GAS INTAKE ASSEMBLY

[76] Inventor: Walter Koziol, 18845 State Line Rd., Antioch, Ill. 60002

[21] Appl. No.: 548,724

[22] Filed: Nov. 4, 1983

[51] Int. Cl.³ .............................................. F24B 3/00
[52] U.S. Cl. ............................. 126/25 R; 126/41 R
[58] Field of Search ............... 126/25 R, 25 A, 25 B, 126/30, 9 R, 9 B, 39 R, 39 E, 41 R; 431/279, 278

[56] References Cited

U.S. PATENT DOCUMENTS

| | | | |
|---|---|---|---|
| 741,991 | 10/1903 | Adams | 431/278 |
| 905,009 | 11/1908 | Shores | 431/278 |
| 1,827,505 | 10/1931 | Bluhm | 431/278 |
| 2,094,854 | 10/1937 | Smith | 431/278 |
| 3,090,372 | 5/1963 | Evans | 126/41 |
| 3,332,339 | 7/1967 | Helgeson et al. | 126/41 |
| 3,638,635 | 2/1972 | Drennan | 126/41 R |
| 3,938,494 | 2/1976 | Clark | 126/41 R |
| 4,092,975 | 6/1978 | Grammatopoulos | 126/41 R |
| 4,149,516 | 4/1979 | Hall | 126/25 R |
| 4,267,816 | 5/1981 | Koziol | 431/278 |
| 4,373,505 | 2/1983 | Koziol | 126/39 E |

Primary Examiner—Daniel J. O'Connor
Attorney, Agent, or Firm—Quarles & Brady

[57] ABSTRACT

A dual adjustable gas intake assembly for a barbecue grill which can be utilized with various types of gas barbecue grill burners. A venturi tube and a supply tube are connected by a flexible section which will provide both horizontal and vertical adjustment of the supply tube. The flexible section is provided by flexible metal tubing. In one embodiment the supply tube has two flexible sections with a rigid curved section in between. In another embodiment the supply tube is entirely provided by a section of flexible metal tubing.

20 Claims, 6 Drawing Figures

DUAL ADJUSTABLE GAS INTAKE ASSEMBLY

BACKGROUND OF THE INVENTION

This invention relates to a gas venturi tube for a burner element in a barbecue gas grill. More particularly, it relates to a two-way flexible adjustable gas instake assembly for a gas burner element so that proper connection can be made between the burner element and a gas supply nozzle irrespective of the vertical and horizontal distance the burner element is supported from the floor in relation to the gas supply.

Various barbacue grill bases have floors for the burner element located at various positions on the floor and located both vertically and horizontally from the gas supply nozzle. Accordingly, it is necessary to construct each gas intake pipe and venturi tube to match the particular distance from the burner element and the gas supply nozzle so that the burner element is in communication with the gas supply pipe. Cost savings could be effected if one venturi tube is fabricated so as to fit in a suitable manner any burner element in a barbecue base portion and provide proper connection with a gas supply.

The state of the art for gas delivery systems for barbecue grills is illustrated in U.S. Pat. Nos. 3,638,635 and 4,373,505. In U.S. Pat. No. 3,638,635 a one-piece, non-adjustable venturi tube 64 extends from gas valve 70 to burner 25 and is attached thereto by base 65 and screws 63. In U.S. Pat. No. 4,373,505 which is commonly assigned, adjustable securing means such as represented by screw 51 and dimples 50 are provided on the venturi tube 24 and a gas intake tube 55.

It is an advantage of the present invention to provide a venturi tube for a burner in a gas barbecue grill which can operatively provide connection between numerous gas burner elements in grill base floors and a gas intake nozzle which is spaced both horizontally and vertically from the burner. It is another advantage of this invention to provide a dual adjustment means including a flexible hose section between a gas venturi tube and a burner element which can afford positioning of the burner element at various elevations from the floor as well as being spaced horizontally from the gas supply pipe. It is still another advantage of this invention to provide a secure dual adjustable gas intake assembly between a burner element and a gas supply pipe in a gas barbacue grill which will provide quick adjustment without leakage. It is yet another advantage of the present invention to provide a dual adjustable gas intake assembly for a gas grill burner element which can be manufactured and assembled in an economical manner. It is still another advantage of this invention to provide horizontal and vertical adjustment between the venturi tube and a gas intake pipe as well as adjustment for air in the air regulating member.

SUMMARY OF THE INVENTION

The foregoing advantages are accomplished by the present dual adjustable gas intake tube assembly for a gas burner element wherein the burner element has the usual hollow, apertured body member having a central portion for receiving a gas intake member. The dual adjustment of the gas intake tube assembly is effected by means of a first tubular or venturi portion having at least one lateral aperture. An air regulator member is slidably received by the venturi portion at one end thereof to controllably cover the lateral aperture. An opening is provided by the tubular portion at one end for receiving a gas supply means. A second tubular portion has a flexible section and is connected to the first tubular portion at the opposite end. Connecting means are provided in conjunction with the second tubular portion at the end opposite the first tubular portion for connection with a gas burner element. The flexible section provides both horizontal and vertical adjustment of the second tubular portion with the burner element. In one embodiment, the second tubular portion has two flexible sections with a substantially rigid curved section positioned therebetween. In another embodiment, the second tubular portion is formed entirely by a section of flexible tubing.

BRIEF DESCRIPTION OF DRAWING

A better understanding of the present dual adjustable gas intake assembly for a burner element will be accomplished by reference to the drawing wherein.

DESCRIPTION OF THE PREFERRED EMBODIMENT

Figure 1:
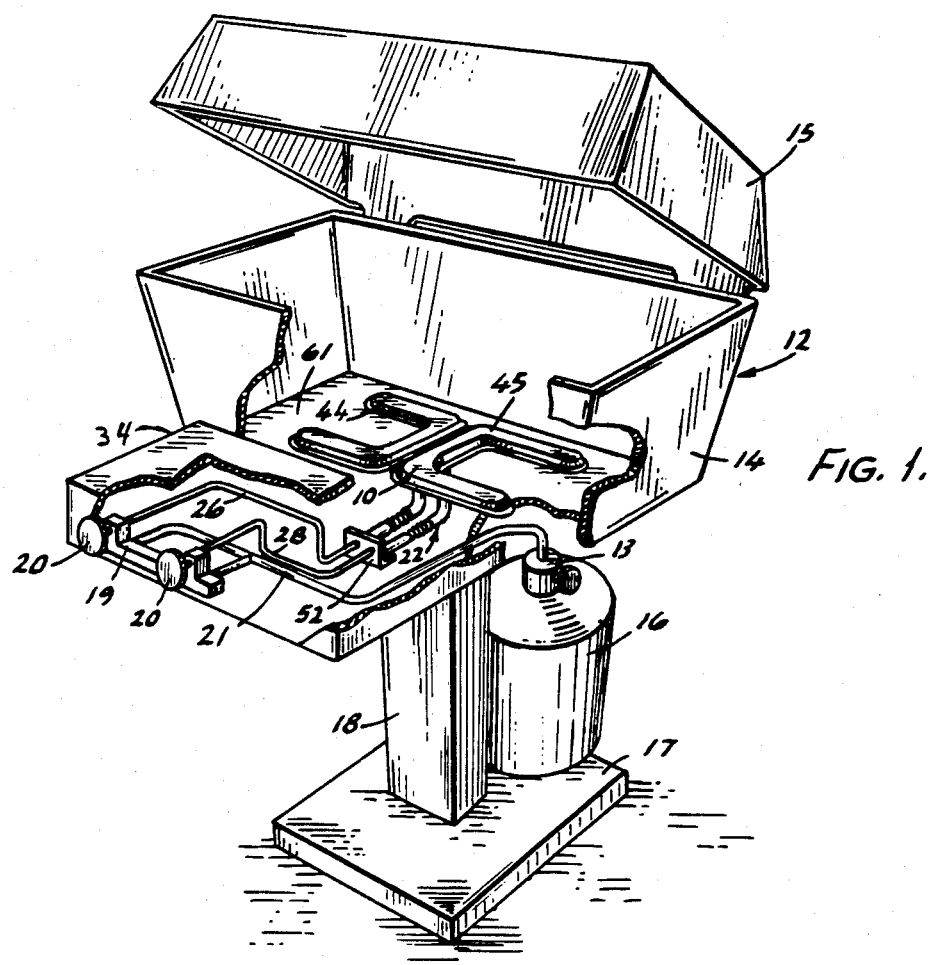
FIG. 1 is a perspective view of a gas barbecue grill unit with portions broken away to illustrate the dual adjustable gas intake or venturi tube assembly and burner element of this invention.

Proceeding to a detailed description of the present invention, a gas burner element 10 is shown in FIG. 1 and is utilized in conjunction with a gas barbecue grill unit generally 12. Grill unit 12 has a base member 14 and will include the usual grate (not shown) over the burner element and will include a cover 15. Base 14 is supported and secured to post 18 which in turn is secured to foot base 17. A gas supply tank 16 is seated on base 17 and has a valve 13 fitted thereon. A gas supply line 21 extends from valve 13 and is interconnected to gas control 19 in housing 34 equipped with control knobs 20. Gas feed lines 26 and 28 extend from gas control 19 as well as through support bracket 52 where each will be positioned in fluid communication with dual adjustable venturi or gas intake assembly generally 22. Each venturi tube assembly in turn is connected with the U-shaped hollow body members 44 and 45 of gas burner element 10.

Figure 2:
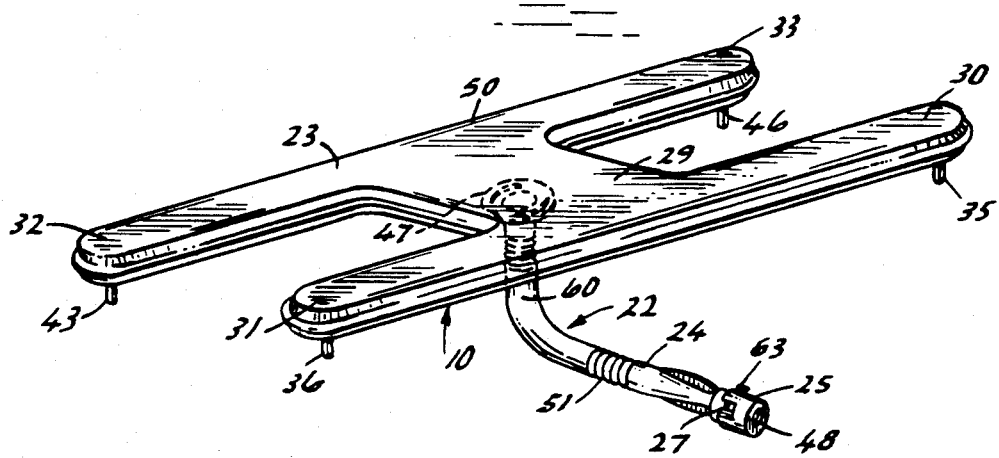
FIG. 2 is a perspective view of the dual adjustable venturi tube of this invention operatively connected to an alternative burner element.

Referring to FIG. 2, it will be seen that venturi tube assembly 22 includes a venturi tube portion 24 with the usual rotatable air regulator 25 to adjustably cover opening 27 with screw 63 providing movable capture by riding in a slot 62 (see FIG. 3) in regulator 25. Venturi tube portion 24 is integrally secured to supply tube portion 60 by means of a flexible metal tube or bellows portion 51. Supply tube 60 is in turn connected to burner element 50 as will be later explained in conjunction with FIGS. 3 and 4. It will be seen that burner element generally 50 differs from burner 10 in that while having a hollow body member 23, it has a common central portion 29 from which extend arm portions 30, 31, 32 and 33. Projecting from each arm portion 30–33 are adjustable leg members 35, 36, 43 and 46, respectively.

Figure 3:
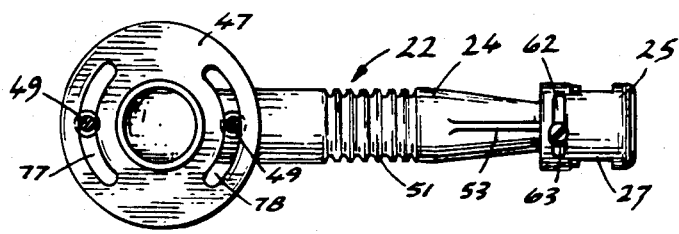
FIG. 3 is a top plan view of the dual adjustable gas intake assembly disconnected from the burner element.
Figure 4:
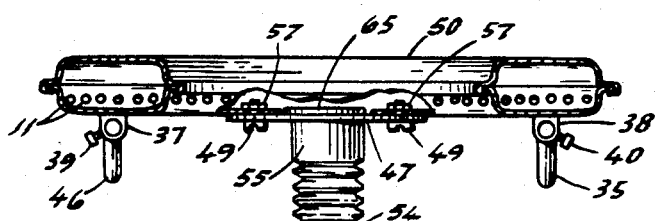
FIG. 4 is a view in side elevation of the dual adjustable venturi tube of FIG. 3 connected to a burner element with portions of the burner element broken away and illustrating the adjustable leg members extending from the burner element.

Referring to FIGS. 3 and 4, it will be seen that circular flange 47 has two arcuate slots 77 and 78 which will receive screws 49 which in turn are fastened to nuts 57 carried by burner element 50. Flange 47 is connected to gas intake section 55 of supply tube 60 by means of a flexible metal tube or bellows portion 54. It will also be noted in conjunction with burner element 50 that leg members such as 46 and 35 are pivotally and longitudinally adjustable by being carried in tubular portions 37 and 38 which form a part of burner element 50 and secured by screws 39 and 40. For further detail regarding the adjustable legs, reference is made to U.S. Pat. No. 4,267,816 of the same inventor. Venturi tube portion 24 has the usual finned section such as indicated at 53 for strength purposes. Also as illustrated in FIG. 3, slot 62 in rotatable air regulator 25 affords rotatable adjustment under screw head 63 to adjust opening 27.

Figure 5:
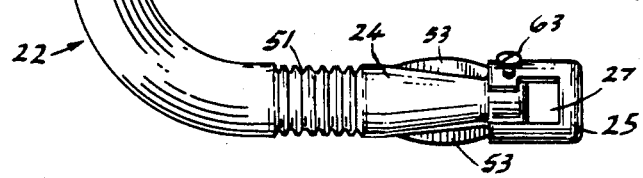
FIG. 5 is a view similar to FIG. 3 illustrating an alternative embodiment.
Figure 6:
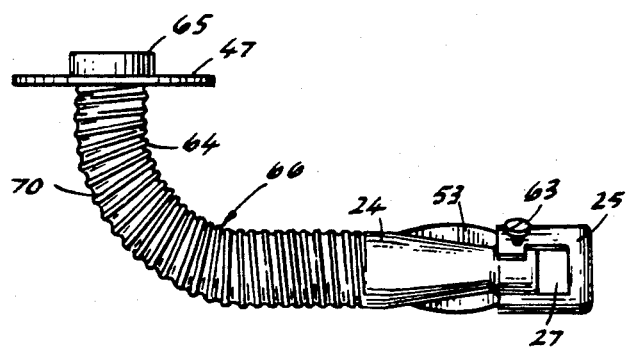
FIG. 6 is a view similar to FIG. 4 showing the embodiment of FIG. 5 without attachment to a burner element.

Referring to FIGS. 5 and 6, venturi tube assembly generally 66 is specifically illustrated. It will be seen that venturi tube assembly 66 has a flexible metal tube or bellows section 64 integrally connected to and extending from venturi tube 24 which as in embodiment 22 has a finned section 53, rotatable air regulator 25 as well as slot 62 and adjusting screw 63. Flexible tube 64 is attached at the end opposite venturi tube 24 to flange 47 and extension 65 for attachment to burners 44, 45 and 50, in the manner previously indicated. It will be seen that in this embodiment flexible tube 64 with elbow portion 70 in one unit serves the same function as flexible portions 51, 54 and rigid supply tube 60 in embodiment 22.

An important aspect of this invention is the fact that both longitudinal or horizontal adjustment as well as vertical adjustment are afforded between a gas burner such as 50 and gas supply tube sections such as 26 and 28 which will have the usual nozzle portions at the end thereof. When it is desired to assemble the dual adjustable venturi assemblies 22 or 66 with burner element 50, all that is required is for flange 47 to be secured to burner 50 by means of screws 49 being passed through slots 77 and 78 so that screws will engage nuts 57. Leg members 35, 36, 43 and 46 will rest on footpads or similar surfaces on floor 61 of base member 14 of gas grill unit 12. The next alignment which will be made will be to place the nozzles of gas feed lines 26 and 28 in opening 48 of rotatable air regulator 25. Suitable adjustment will be made between burner 50 and venturi tube 24 by means of the flexible movements of flexible portions 51, 54 in embodiment 22 or 64 in embodiment 66. It should also be pointed out that this flexing affords both longitudinal or horizontal distance as well as vertical adjustment. Radial adjustment for screws 49 and nuts 57 is also afforded with the burner 50 by means of flange 47 with arcuate slots 77 and 78 as rotation will be afforded by flexible sections 54 or 64.

Gas-fired grill unit 12 is made of cast aluminum whereas the burner elements 50 and 44, 45 are manufactured from steel. Venturi tube portions 24 and rigid supply tube portion 60 are also made from steel and are usually chrome-plated. Flexible portions 51, 54 and 64 are fabricated from either copper, a brass alloy or a high heat plastic material and are secured to venturi tube portions 24 and in the instance of embodiment 22, to portions 60 and 55 by pressure fit, welding, gluing, soldering or crimping. Screws 49 and 63 are of the machine type. While burners 44 and 45 are shown as U-shaped, it will be appreciated that the adjustable tube assemblies of this invention could be utilized with any configuration of burner, as indicated by burner 50, whether of a straight tube, star-shaped or figure eight variety.

It will thus be seen that in the present invention there is now provided a dual adjustable venturi assembly which is fabricated to fit numerous types of barbecue grills irrespective of the vertical and horizontal space differences between the burner element and the gas supply means. Not only is horizontal and vertical adjustment afforded but also radial adjustment as well. The various adjustments of the venturi tube and gas supply tubes are easily effected by means of flexible tube portions and in conjunction with adjustable leg members afford very versatile adjustable venturi tube assemblies particularly useful in conjunction with the gas supply that is positioned at right angles with respect to the burner element. Also, while the gas supply tubes and nozzles have been indicated for connection through an air regulator 25, obviously various types of connections can be made with the gas supply tube and the venturi tube 24 and still utilize the dual adjustable features of this invention. Further, a rounded bracket or flange 47 is indicated in FIG. 3 with closed arcuate slots 77 and 78. If desired, a mounting bracket or flange could be used in conjunction with intake member 55 or supply tube 64, with the flange having open slots and the bracket being generally Z-shaped. Also, if desired, screw 49 could be positioned in burner element 50 and nut 57 positioned under slots 77 and 78.

The foregoing invention can now be practiced by those skilled in the art. Such skilled persons will know that the invention is not necessarily restricted to the particular embodiments presented herein. The scope of the invention is to be defined by terms of the following claims as given meaning by the preceding description.

I claim:

1. A dual adjustable gas intake tube assembly for a gas burner element comprising:
   a first tubular portion defining at least one lateral aperture;
   an air regulator member slidably received by said tubular portion at one end thereof to controllably cover said lateral aperture;
   an opening defined by said tubular portion at one end for receiving a gas supply means;
   a second tubular portion having a flexible section and connected to said first tubular portion at the other end, said flexible section constructed and arranged to provide both horizontal and vertical adjustment of said second tubular portion; and
   means operatively associated with said second tubular portion for connection with a gas burner element.

2. The dual adjustable gas intake tube assembly as defined in claim 1 wherein said second tubular portion is defined by two flexible sections with a substantially rigid curved section positioned therebetween.

3. The dual adjustable gas intake tube assembly as defined in claim 2 wherein said second tubular portion is integrally connected to said first tubular portion.

4. The dual adjustable gas intake tube assembly as defined in claim 1 wherein said second tubular portion is entirely defined by a section of flexible tubing.

5. The dual adjustable gas intake tube assembly as defined in claim 4 wherein said second tubular portion is integrally connected to said first tubular portion.

6. The dual adjustable gas intake tube assembly as defined in claim 1 wherein said air regulator includes an opening for receiving said gas supply means.

7. The dual adjustable gas intake tube assembly as defined in claim 1 wherein said means to connect said second tubular portion to said burner element is a slotted and rotatable connecting member, said rotation being provided by said flexible section.

8. A dual adjustable gas burner assembly comprising:
 a first tubular portion defining at least one lateral aperture;
 an air regulator member slidably received by said tubular portion at one end thereof to controllably cover said lateral aperture;
 an opening defined by said tubular portion at one end for receiving a gas supply means;
 a second tubular portion having a flexible section and connected to said first tubular portion at the other end, said flexible section constructed and arranged to provide both horizontal and vertical adjustment of said second tubular portion; and
 a burner element adapted to be connected to said second tubular portion at an end opposite said first tubular portion, said burner element including adjustable leg means.

9. The dual adjustable gas burner assembly as defined in claim 8 wherein said second tubular portion is defined by two flexible sections with a substantially rigid curved section positioned therebetween.

10. The dual adjustable gas burner assembly as defined in claim 9 wherein said second tubular portion is integrally connected to said first tubular portion.

11. The dual adjustable gas burner assembly as defined in claim 8 wherein said second tubular portion is entirely defined by a section of flexible tubing.

12. The dual adjustable gas burner assembly as defined in claim 10 wherein said second tubular portion is integrally connected to said first tubular portion.

13. The dual adjustable gas burner assembly as defined in claim 8 wherein said air regulator includes an opening for receiving said gas supply means.

14. The dual adjustable gas burner assembly as defined in claim 8 further including means operatively associated with said second tubular portion for connection with said burner element, said means to connect said second tubular portion to said burner element being a slotted and rotatable connecting member, said rotation being provided by said flexible section.

15. The dual adjustable gas burner assembly as defined in claim 8 further including a base member for a barbecue grill with said burner element and said tubular portions housed therein.

16. The dual adjustable gas burner assembly as defined in claim 8 further including a base member for a barbecue grill with two of said burner elements housed therein as well as two of said first and second tubular portions.

17. The dual adjustable gas burner assembly as defined in claim 8 further including a base member for a barbecue grill with said burner element and tubular portions housed therein and said gas supply means includes gas regulating means operatively positioned in a housing outside said base member.

18. The dual adustable gas burner assembly as defined in claim 8 further including a base member for a barbecue grill wth two of said burner elements housed therein as well as two of said first and second tubular portions and said gas supply means includes gas regulatory means operatively positioned in a housing outside said base member for each said burner element.

19. The dual adjustable gas intake tube assembly as defined in claim 1 wherein said burner element comprises a single burner unit and said dual adjustable gas intake tube assembly is a single unit.

20. The dual adjustable gas intake tube assembly as defined in claim 1 wherein said burner element comprises a dual burner element and said dual adjustable gas intake tube assembly is a dual unit.

* * * * *

UNITED STATES PATENT AND TRADEMARK OFFICE
CERTIFICATE OF CORRECTION

PATENT NO. : 4,488,534
DATED : December 18, 1984
INVENTOR(S) : Koziol

It is certified that error appears in the above-identified patent and that said Letters Patent is hereby corrected as shown below:

Column 1, line 8,   "instake" should read --intake--

Column 1, line 13,  "barbacue" should read --barbecue--

Column 1, line 48   "barbacue" should read --barbecue--

Column 6, line 29   "adustable" should read --adjustable--

Column 6, line 2    "10" should read --11--.

Signed and Sealed this

Seventeenth Day of September 1985

[SEAL]

Attest:

DONALD J. QUIGG

Attesting Officer

Commissioner of Patents and Trademarks—Designate